UNITED STATES PATENT OFFICE.

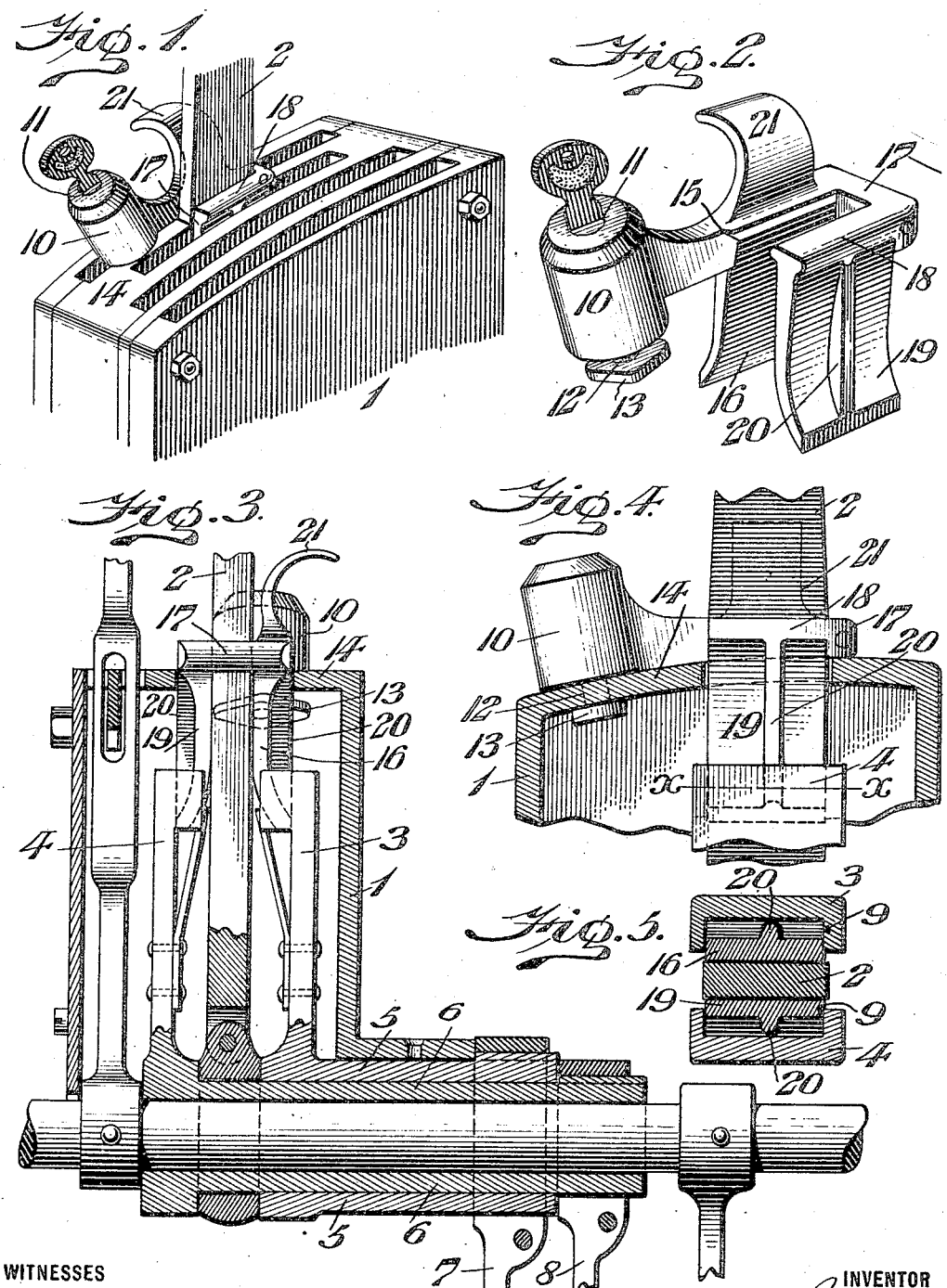

WILLIAM H. RODGERS, OF PHILADELPHIA, PENNSYLVANIA.

LOCK FOR AUTOMOBILES.

1,127,519.      Specification of Letters Patent.      Patented Feb. 9, 1915.

Application filed July 3, 1913. Serial No. 777,173.

*To all whom it may concern:*

Be it known that I, WILLIAM H. RODGERS, a citizen of the United States, residing in the city and county of Philadelphia, State of Pennsylvania, have invented a new and useful Lock for Automobiles, of which the following is a specification.

My invention relates to a new and useful lock for the transmission mechanism as applied to automobiles, and consists of means adapted to enter the slot of a gear shifting table to directly engage the gear shifting means therein below the top of the table, in order to lock the same against movement, and means for locking said engaging means to the table.

It further consists of means engaging with the actuating lever to lock the same against lateral movement, when in neutral position, and engaging with the gear shifting means to lock the same against longitudinal movement, and means for locking the engaging means to the gear shifting table.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a perspective view of a gear shifting table, broken away, showing a portion of the actuating lever and the lock in position. Fig. 2 represents a perspective view of the lock. Fig. 3 represents a transverse section, on an enlarged scale, of a gear shifting table, showing gear shifting means and the lock in engagement therewith. Fig. 4 represents a longitudinal section of a portion of the parts shown in Fig. 3. Fig. 5 represents a sectional view on line x—x Fig. 4.

Similar numerals of reference indicate corresponding parts in the figures.

Referring to the drawings:—It will be understood that in the drawings, I have shown one form of a gear shifting table and actuating lever, which latter is shown in neutral position, and one form of gear shifting means for an automobile, but it will be evident that different makes or styles of cars have different forms of tables and of gear shifting means, so that the form herein shown is but one of many to which my invention is applicable.

In the drawings, I have shown a construction of table and gear shifting means known as the "selective" type, but my invention is adapted for use with the so-called "progressive" type, as well.

1 designates a gear shifting table having a so-called shifting gate, consisting of slots, in which the actuating lever 2 is moved, in order that the same may be placed in engagement with the different gear shifting means, to vary the speed of the car or to reverse the same, or can be moved to neutral position out of engagement with the gear shifting means, in which position the gear shifting means are also in neutral position, with the gears out of engagement.

It will be understood that the actuating lever is adapted to be thrown into or out of engagement with the gear shifting means, which may be of any suitable construction, and as here shown, consist of gear shifting arms 3 and 4, one carried by a sleeve 5 and the other carried by a sleeve 6, which also carry or are connected with arms 7 and 8 connected to the movable gears, so that when either of the shifting arms 3 or 4 are properly engaged with the lever 2 and moved longitudinally, the proper gear is thrown into engagement, in order to control the driving means, it being understood further that the shifting arms 3 and 4, as here illustrated, are each provided with a suitable recess 9 adapted for the reception of the actuating lever 2, when the said lever is moved to accomplish this engagement, and that when the said actuating lever is in neutral position, that is, in the form shown in the drawing in the cross slot of the shifting gate, the said gear shifting means are also located in neutral position with the gears out of engagement. When the gear shifting means are in neutral position, it will be impossible to start the car without throwing the gears into mesh, and my lock is designed to lock the gear shifting means in neutral or inoperative position. To this end, 10 designates the body of the lock formed of any suitable shape, here shown as cylindrical, carrying a suitable lock proper, such as a Yale lock, 11.

12 designates a rod carried by the lock 11, capable of rotation when the lock is actuated, which rod extends downwardly a sufficient distance in order to enter the slot of the gear shifting table 1 and to permit of a member 13, carried by said rod 12, to be turned with the rod, in order that the said member 13 will engage under the wall of the top plate 14 of the gear table 1.

In the form here shown, I have provided an arm 15 extending from the body portion 10, having a depending plate or member 16 which is adapted to enter one of the slots of the gear table, and in the present instance, I have shown a second arm 17 extending at an angle from the member 16 and an arm 18 extending angularly from the arm 17, and a second plate or member 19 depends from the said arm 18, so that the said two members or plates 16 and 19 are oppositely opposed with a space therebetween, forming a yoke-like structure, said second member 19 being also adapted to enter a slot of the gear table, of the construction shown in the drawings, with the actuating lever 2 extending upwardly therebetween, and said members are adapted to enter the recesses 9 of the gear shifting means to directly engage therewith, below the top of the table, so that when the member 13 of the lock is turned to engage the underside of the top plate 14 of the gear table 1, and the key of the lock is removed, the device will be firmly and positively secured in position, and movement of the gear shifting means from neutral position will be positively prevented, while at the same time, by reason of the situation of the members 16 and 19, within the slots and upon opposite sides of the actuating lever 2, this lever will also be locked in position, so that movement of this lever will be positively prevented, that is to say, I have provided means engaging with the actuating lever to lock the same against lateral movement and engaging with the gear shifting means to lock the same against longitudinal movement so that it will be impossible to start the machine, under any circumstances, without first removing the lock.

As will be noted, each of said members 16 and 19 are situated between the sides of the lever 2 and the gear shifting means 3 and 4 depending downwardly within the table in close proximity to the respective sides of the lever 2. In the drawings, I have shown the members as being preferably curved outwardly at their lower ends, in order to abut with the sides of the gear shifting means, and I have provided a flange or rib 20 extending a suitable distance on the outer face of each of the members 16 and 19, in order that the ribs will bear against the gear actuating means, while the inner face of the members bear against the sides of the lever 2, and the whole lock will act in such a manner as to provide means whereby the lever 2, the gear shifting means 3 and 4, and the gear table 1 are all locked together firmly and positively.

To remove the lock, it is only necessary to insert the proper key, turn the lock, and so turn the rod 12 into the position that the member 13 thereof be released from engagement with the underside of the top wall of the gear table 1, and the entire lock can be removed from engagement with the actuating lever 2 and the gear shifting means 3 and 4.

For convenience, I provide a handle 21 on the device, which extends in a suitable manner to be grasped by the hand of the operator.

Other modes of applying the principle of my invention may be employed for the mode herein explained. Change may therefore be made as regards the mechanism thus disclosed, provided the principles of construction set forth respectively in the following claims are employed.

Having thus described my invention what I claim as new and desire to secure by Letters Patent, is:—

1. In a lock for automobiles, a yoke-like body, members projecting downwardly from the opposite sides thereof and adapted to enter different slots in a gear table, and on opposite sides of the gear shifting lever, and having their ends extend sufficiently below the top of said gear table to engage with the gear shifting means therein, an arm extending from one side of said body, and a lock carried by said arm and having a locking member extending below the lower wall of said lock, and adapted to enter one of the said slots of the said gear table, and to be actuated to engage beneath the top wall of the table, when the device is in operative position, to lock said gear shifting lever and said gear shifting means with respect to each other and with respect to said table.

2. In a lock for automobiles, a U-shaped body, members projecting downwardly from the opposite sides thereof, said members being adapted to enter different slots of a gear table and on opposite sides of the gear shifting lever, when in neutral position, an arm projecting from one end of said body, and a lock carried by said arm and having a locking member situated at a distance below the bottom of said lock and adapted to enter one of the slots of the gear table and, to be actuated to engage with the bottom wall of the top of said table when the device is in operative position.

WILLIAM H. RODGERS.

Witnesses:
WM. CANER WIEDERSEIM,
C. D. McVAY.